July 27, 1954 H. JOHNSON 2,685,031

NOISE VOLTAGE GENERATOR

Filed Dec. 24, 1949

Inventor

HARWICK JOHNSON

By Morris L. Rabkin

Attorney

Patented July 27, 1954

2,685,031

UNITED STATES PATENT OFFICE 2,685,031

NOISE VOLTAGE GENERATOR

Harwick Johnson, Princeton, N. J., assignor to Radio Corporation of America, a corporation of Delaware Application December 24, 1949, Serial No. 135,007

5 Claims. (Cl. 250—36)

Figures 1, 2, 3:
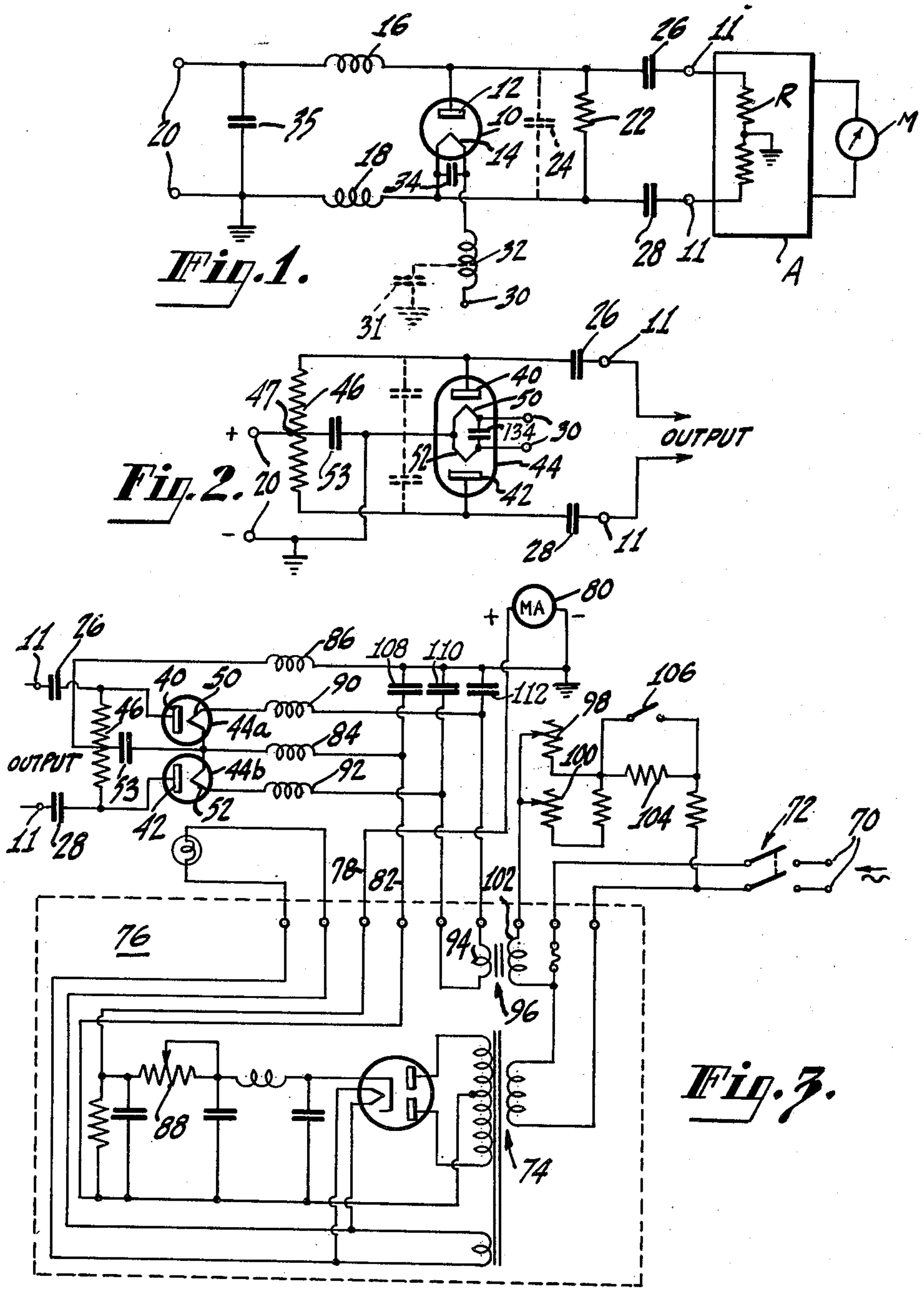

This invention relates to improvements in noise generators for testing electrical apparatus such as radio and television receivers, and particularly to noise generators comprising so-called noise diode tubes.

The sensitivity of apparatus such as a radio receiver or an amplifier intended for small signal operation is one of the most important operating characteristics since it is a measure of the ability of the apparatus to detect a weak signal. As is well known, the ultimate sensitivity of such apparatus is limited by noises arising within the apparatus. Consequently, it has become more or less standard practice to describe the sensitivity of such apparatus in terms of a comparison between noise generated in the apparatus and the thermal noise of a resistor equivalent to the resistance of the voltage source with which the apparatus is designed to operate, such as the radiation resistance of an antenna. This measure of sensitivity is variously known as the noise factor or noise figure.

The temperature limited diode is an extremely convenient standard noise source for measuring the noise factor of a receiver. The term "temperature limited diode" is used herein and in the appended claims to designate a thermionic tube having an anode and a heated cathode and operated at an anode voltage sufficient to draw all the electrons emitted by the cathode to the anode and thus prevent the accumulation of space charge in the cathode-anode space. The current fluctuations appearing at the terminals of such a diode are due to the discrete nature of the electrons constituting the space current flow and the random fashion in which they are emitted by the cathode.

The application of noise diodes to very high frequency operation leads to considerable complexity due to the tuning arrangements required, particularly in the case of operation with balanced circuits (the term "balanced circuit" being used herein and in the appended claims to designate a circuit wherein the effective impedance measured between either of two input terminals and a common reference point in the circuit, usually "ground," is substantially the same. The alignment and adjustment of critically tuned circuits in the noise generator requires equipment which may not be available in the average industrial laboratory and ordinarily is not available to the individual worker.

It is, accordingly, an object of the present invention to provide a simple untuned noise diode circuit suitable for use in frequency ranges above those for which such circuits normally are applicable.

Another object of the invention is to provide a balanced output thermionic source for producing noise currents across a relatively wide band of frequencies without complex tuning arrangements.

In accordance with the invention, the foregoing and other related objects and advantages are attained by a symmetrical arrangement of temperature limited noise diodes wherein all of the power supply connections are substantially at radio frequency ground potential. As will be shown, such an arrangement reduces the shunting effect of the noise source and simplifies the problem of energizing the generator.

A more complete understanding of the invention can be had by reference to the following description of an illustrative embodiment thereof, when considered in connection with the accompanying drawings, in which:

Figure 1 is a schematic diagram of a noise generator of the type with which my present invention is concerned, Figure 2 is a schematic diagram of a circuit illustrating the principles of my invention, and Figure 3 is a circuit diagram of a complete apparatus embodying the principles illustrated in Figure 2.

The theory of operation of noise generators using temperature-limited diodes has been described in detail in the literature (see e. g. Microwave Receivers, McGraw-Hill Book Co., Inc., 1948, pp. 318–323), and will not be repeated here. In general, such a generator usually comprises a temperature-limited diode connected in a network arranged to have an impedance value equivalent to the impedance of the source with which the circuit being tested is designed to operate. An equivalent circuit of such apparatus is shown in the RCA Review, vol. 8, at page 170. For accurate results, the actual circuit used should be made to approximate this equivalent circuit as closely as possible, especially with respect to the impedance presented by the generator to the circuit being tested.

Where a noise generator of the foregoing type is used to determine the noise factor of a relatively high frequency device having a balanced input circuit, such as a television receiver with a so-called "elevator" input transformer, the problems involved in reproducing the equivalent circuit referred to above are especially troublesome.

In Figure 1 of the accompanying drawing, there is shown a single diode noise generator for supplying noise voltages to an apparatus A having a balanced input circuit represented schematically as a center-tapped resistor R, with an output meter M being provided to measure the noise output of the apparatus A. The noise generator of Fig. 1 comprises a diode 10 having an anode 12 and a filamentary cathode 14 connected through a pair of coils, 16 and 18, respectively, to voltage input terminals 20, through which a unidirectional voltage can be applied across the diode 10 from any suitable source (not shown). A resistor 22 is connected in parallel with the diode 10, and has a value corresponding to the internal resistance of the signal source with which the apparatus A is designed to operate. Two blocking capacitors 26, 28 are provided to prevent direct current from flowing into the apparatus A.

A terminal 30 is provided for supplying heating current to the filament 40 through a coil 32 from any suitable low voltage source (not shown). A capacitor 34 is connected across the filament 14 to eliminate radio frequency potentials across the filament 14.

In the apparatus shown in Fig. 1, when suitable unidirectional voltages are applied to the terminals 20, 30 to cause temperature-limited current to flow in the diode 10, noise voltages covering a relatively wide band of frequencies will be generated for utilization at the output terminals 11.

Where the noise generator of Fig. 1 is to be used with relatively low frequency apparatus, say in the range up to three or four megacycles, the shunting effect of the diode capacitance (represented by the dotted line capacitor 24) across the resistor 22 is negligible. However, where the frequencies involved are of the order of two hundred megacycles, such as in the case of television receivers and the like, the shunting effect of the diode 10 will seriously alter the effective impedance of the resistor 22, and must be counteracted by providing coils 16 and 18, resonated with the tube capacity, to avoid this shunting effect. A relatively large capacitor 35 effectively connects the coils 16, 18 in series across the diode 10. The coils 16, 18 must be carefully tuned with the diode capacitance 24, and this tuning will be satisfactory only for a relatively narrow band of frequencies, say 10 to 15 megacycles wide, in the portion of the spectrum presently being considered. If the equipment is to operate satisfactorily in a number of different frequency bands, as in the various television channels, separate sets of resonating coils must be provided for each frequency band of interest, with each set of coils being carefully adjusted to resonance with the diode capacity at the center of the frequency band involved.

A further difficulty involved in the apparatus of Fig. 1 arises from the fact that the filament coil 32, which is required in order to operate the filament 14 above radio frequency ground potential to provide balanced output, will introduce a capacity effect (represented by the dotted-line capacitor 31), making it necessary to tune the coil 32 to resonate with this shunt capacity 31 at the center of each frequency band in which the noise generator is used. On the other hand, the low frequency limit for the circuit of Fig. 1 is fixed by the impedance of the coils 16, 18, 32 as compared with the resistance of the resistor 22. Consequently, the noise generator shown in Fig. 1 becomes quite complex when it is used in a frequency range such as that involved in television systems.

In Figure 2 there is shown the basic circuit of a noise generating apparatus in which the foregoing difficulties are substantially reduced. In the apparatus of Fig. 2, a symmetrical arrangement is provided in which anode electrodes 40, 42 of a double diode tube 44 are connected to output terminals 11 and to opposite ends of a center tapped resistor 46. For simplicity, a single envelope is shown for the tube 44, although it is evident that two separate tubes can be connected in the same manner, and where two diodes or a double diode are referred to herein, it will be understood that either a single envelope or two separate envelopes can be used. Filamentary cathodes 50, 52 in the tube 44 are connected to one of a pair of unidirectional voltage input terminals 20, the other input terminal being connected to the center tap 47 of the resistor 46. Thus, the two diode sections are serially connected in opposite polarity across the output terminals 11. A by-pass capacitor 53 connected between the resistor center tap 47 and ground places the center tap at radio frequency ground potential. Filament voltage input terminals 33 are provided for supplying heating current to the filamentary cathodes 50, 52, and a by-pass capacitor 34 is connected across the terminals 30 to equalize any small radio frequency potentials that might appear on the cathodes 50, 52. Blocking capacitors 26, 28 are provided to prevent flow of direct current into the apparatus being tested.

In the apparatus shown in Fig. 2, it can be seen that all of the input terminals 20, 30 are essentially at radio frequency ground potential, thereby eliminating the need for critically tuned coils in the filament and plate circuits. Moreover, the capacitances between the anodes 40, 42 and the cathodes 50, 52 are in series across the resistor 46, so that the effective capacitance of the tube 44 is only one half of that for a single diode, such as the diode 10 in Fig. 1.

To illustrate the importance of this reduction in shunting capacitance from the standpoint of frequency limitations, the following example for a typical noise diode tube is of interest. The published capacitance of the Sylvania type 5722 noise diode is 1.5 $\mu\mu$ farads. For facility of computation, the error resulting from the diode capacitance when measurements are made on a "matched" television receiver will be considered. If an allowable error due to the diode capacitance of 0.5 decibel is permitted in the matched case, it can be shown that the maximum permissible ratio of capacitive reactance to the terminating resistance is about 2.5 to 1. Assuming a case where the impedance of the noise source (value of resistor 46 in Fig. 2) is to be 300 ohms, then a .5 decibel error will correspond to a capacitive reactance $x_c$ of $$x_c = 2.5(300) = 750 \text{ ohms}$$

For a capacitance of .75 $\mu\mu$ farads, corresponding to two type 5722 noise diodes connected as in Fig. 2, this reactance will be obtained at a frequency of 283 megacycles. For a single diode circuit, the limiting frequency would be one half of this, or 141.5 megacycles. This limit has been calculated for the diode capacitance alone, and would be further reduced by stray circuit capacitances. Furthermore, in the case of an unmatched receiver, the error may be more or less than the above depending on the degree of match and the length of the connecting transmission line. However, by exercising care in circuit construction, it is evident that an untuned noise generator can be constructed which will be satisfactory for engineering measurements to about 200 megacycles. This range would cover the "very high frequency" television bands, where there is outstanding need for a simple noise source.

In Fig. 3 there is shown a complete noise generator embodying the principles illustrated in Fig. 2. The apparatus shown in Fig. 3 is adapted to be operated from an alternating voltage supply source (not shown), and comprises alternating voltage input terminals 70 connected through a switch 72 to a transformer 74 in a conventional full wave rectifier power supply system 76. The "positive" output lead 78 of the power supply 76 is connected to ground through a milliammeter 80, while the "negative" output lead 82 of the power supply 76 is connected to the noise diode filamentary cathodes 50, 52 through a choke coil 84. The diode anodes 40, 42 are returned to ground through the resistor 46 and a choke coil 86, so that the direct current of the diodes 44*a*, 44*b* will pass through the meter 80 for measurement thereof. A variable resistor 88 is provided in the power supply 76 for adjusting the anode-cathode voltage of the diodes 44*a*, 44*b*.

The diode filaments 50, 52 are connected to receive heating current through choke coils 90, 92 from the secondary winding 94 of a transformer 96, and variable resistors 98, 100 are connected to adjust the voltage applied to the transformer primary winding 102 in order to vary the temperature of the diode filaments 50, 52 as desired. The resistors 98, 100 provide for "coarse" and "fine" temperature control, while a further resistor 104 in the input circuit of the transformer winding 102 is shunted by a switch 106 to give a still wider range of filament temperature control. By-pass capacitors 108, 110, 112 are connected between ground and the filament supply leads to prevent any radio frequency voltages from passing back into the power supply.

While the choke coils 84, 86, 90, 92 are not required in making noise factor measurements on an apparatus having a perfectly balanced input circuit, unbalance currents may arise if the input of the apparatus being tested is not perfectly balanced, making it advisable to provide the choke coils as shown. Also, these coils will serve to reject spurious external signals which might interfere with noise measurements. However, it is to be noted that these choke coils are not at all critical from the standpoint of tuning, as is the case in the circuit of Fig. 1, and need not be changed for operation of the noise generator anywhere within the frequency limits determined by the diode and other capacities shunting the resistor 46. Similar coils would be equally useful as spurious signal rejectors in a circuit of the type shown in Fig. 1.

The apparatus shown in Fig. 3 can be connected for noise factor measurements in the manner shown in Fig. 1, and utilized as follows. The noise output of the apparatus being tested first is measured with the noise generator turned off. The noise generator then is turned on, and the filament voltage increased (by adjustment of the resistors 98, 100 and the switch 106) until the noise output of the apparatus being tested has doubled. With the double diode noise generator shown in Fig. 3, the noise factor F of the apparatus being tested can be obtained directly from the formula $$F=5\,IR_1$$

wherein I is the diode current (measured by the meter 80), and $R_1$ is the resistance of the resistor 46.

The formula for noise figure given above differs from the familiar expression $F=20\,IR$, given in the previously mentioned book "Microwave Receivers," due to the connection of the two diodes 44*a*, 44*b* in the symmetrical manner shown.

As compared with a single diode noise generator, it will be seen that the double diode noise generator described herein has the advantage of wide band "very high frequency" operation without critical components, tuned circuits, or coil switching arrangements, and since no circuit adjustments are required, the necessity for specialized alignment equipment is eliminated. These advantages more than compensate for the slight increase in power requirements and the slight loss in available maximum noise.

What is claimed is:

1. In a noise voltage generator for supplying noise voltages to an apparatus having a balanced input circuit to determine the noise factor of said apparatus, in combination, a pair of output terminals adapted to be connected to said balanced input circuit, a center tapped resistor connected between said terminals and having a resistance equal to the resistance of a signal source with which said apparatus is designed to operate, a pair of thermionic diode tubes each having an anode and a cathode, said tubes being serially connected in opposite polarity between said terminals, and means connected to said center tap and to said cathodes for generating temperature-limited space current flow in said diodes.

2. In a noise generator for generating noise voltages with frequency components extending across a relatively wide band of frequencies, in combination, a pair of output terminals adapted to be connected to a balanced circuit, a tapped impedance element connected between said terminals, two filamentary cathode electrodes connected together and coupled to the midpoint of said impedance element, means to supply heating current to said cathodes, two anode electrodes associated one with each of said cathodes and connected one to each of said output terminals, and means to connect said midpoint and said cathodes to a unidirectional voltage source to establish temperature-limited space-current flow between said anodes and said cathodes.

3. Apparatus for supplying to a balanced circuit noise voltages with frequency components extending across a relatively wide band of frequencies, said apparatus comprising, a pair of output terminals, a center tapped resistor connected between said terminals, two diode vacuum tubes having anode electrodes connected to opposite ones of said output terminals and having filamentary cathodes, a source of unidirectional voltage connected between said cathodes and the center tap of said resistor for establishing space current flow in said tubes, and a source of variable magnitude heating current connected to said filamentary cathodes.

4. A noise voltage generator for supplying noise voltages to a balanced input circuit in an electrical apparatus to determine the noise factor of said apparatus, said generator comprising a pair of thermionic diode tubes each having an anode and a cathode, said cathodes being connected together, means to heat said cathodes, a divided impedance connecting said anodes, and means to apply a unidirectional voltage through said impedance to said tubes between said anodes and cathodes to generate temperature-limited space-current flow in said tubes.

5. A noise voltage generator comprising a pair of diode tubes each having an anode and a filamentary cathode, a source of variable magnitude heating current connected to said filamentary cathodes, a center-tapped resistor connecting said anodes, and a source of unidirectional voltage connected between said center tap and said cathodes for establishing temperature-limited space-current flow in said tubes.

References Cited in the file of this patent

UNITED STATES PATENTS

| Number | Name | Date |
|---|---|---|
| 1,908,649 | Spaeth | May 9, 1933 |
| 2,416,307 | Grieg | Feb. 25, 1947 |
| 2,519,890 | Crosby | Aug. 22, 1950 |
| 2,538,028 | Mozley | Jan. 16, 1951 |